Patented Oct. 25, 1938

2,133,972

UNITED STATES PATENT OFFICE 2,133,972

HOUSEHOLD SPRAY

Gerald H. Coleman and John W. Zemba, Midland, Mich., assignors to The Dow Chemical Company, Midland, Mich., a corporation of Michigan No Drawing. Application August 10, 1937, Serial No. 158,335

10 Claims. (Cl. 167—24)

This invention relates to compositions of matter particularly adapted for use in combating insect pests such as flies, mosquitoes, moths, gnats, and the like.

Petroleum distillate sprays comprising insecticidal plant products are widely used for the control of household insect pests. Pyrethrin sprays are known to have a quick but temporary paralyzing action on flies and similar insects. Where it is possible to collect and destroy paralyzed insects immediately after treatment therewith, the use of pyrethrum extracts has proved adequate, but, generally speaking, the kill obtained thereby is low compared to the per cent knockdown of insects.

Petroleum distillate sprays comprising rotenone have been found to give a more permanent control of insects but to have a relatively low knockdown as compared to pyrethrin and to be rather slow in their action, requiring a considerable period of time to actually kill the sprayed insects. A further disadvantage in the use of rotenone lies in its relative insolubility in many petroleum fractions.

The insecticidal plant extracts, pyrethrins, rotenone, and the like, are very unstable to heat and light and upon storage are known to lose their effectiveness to a considerable degree.

It is among the objects of this invention to provide an improved and inexpensive composition for exterminating common insect pests such as flies, mosquitoes, etc., which will be more quickly and more permanently toxic thereto than the fly sprays and insectifuges at present employed. An additional object is to provide a contact insecticide adapted to be employed as a spray composition which will kill a high percentage of flies, the percentage kill of such insects to approach the knockdown initially obtained following the spraying operation. A still further object is to provide a composition readily synthesizable in any desired amount, which will be compatible with the common insecticidal plant extracts, which will serve as a solubilizing agent for difficultly soluble products such as rotenone when used in combination therewith, which will stabilize insecticidal plant products against deterioration, and which will have such characteristics of toxicity toward flies, mosquitoes, moths, etc., that it may be substituted wholly or in part for the plant toxics at present commonly employed in insecticidal sprays.

The terms "per cent" and "percentage", as hereinafter employed in the specification and claims with reference to the composition of various spray materials, refers to grams per 100 milliliters thereof.

We have discovered that, when an hydroxy-alkyl ether of a phenol is added in relatively small amounts to petroleum distillate solutions of insecticidal plant products, such as pyrethrin and rotenone, improved fly spray compositions are obtained which are more stable to heat and light and have a quicker paralyzing effect and greater lethal effect on insects than the original vegetable extract compositions. Such compositions give a kill on flies and the like which more closely approximates the percentage knockdown of such pests than do common household insecticide sprays heretofore employed. We have further discovered that the addition of hydroxy-alkyl ethers of phenols to petroleum distillate solutions of, for example, rotenone or pyrethrins, serves to stabilize such insecticidal products against decomposition and deterioration on exposure to light and/or heat. Furthermore, solutions containing from about 3 to about 10 per cent of the hydroxy-alkyl ethers of the phenols can be substituted for petroleum distillate solutions of insecticidal plant products, such ether solutions comparing favorably in toxic effect with said extracts, and having the added advantage of being completely colorless and odorless, stable to heat, light, and air, and being adapted to storage over long periods of time without decomposition or loss of toxicity.

While any desired amount of hydroxy-alkyl ether compound may be dissolved in a petroleum distillate solution of insecticidal plant products, e. g. pyrethrin, rotenone, etc., the amount required varies indirectly with the concentration of plant products initially present in the composition. For example, the addition of from about 1 to about 5 per cent of an hydroxy-alkyl ether to a pyrethrin solution containing the toxic extract of from ¼ to 1 pound of pyrethrum flowers per gallon, produces a spray material giving a substantially quantitative kill of flies. Similarly, such hydroxy-alkyl ether derivative may be incorporated with rotenone and the mixture subsequently dissolved in petroleum distillate to obtain a spray composition of increased effectiveness, the hydroxy-alkyl ether in addition to increasing the toxicity of the composition serving as a mutual solvent for the rotenone and petroleum distillate and obviating the use of a co-solvent, such as carbon tetrachloride, in the composition. While it is desirable that a portion of the pyrethrins or other insecticidal extract be retained in our new spray composition in order that the high knockdown rate thereof may be utilized, by adding increasing amounts of hydroxy-alkyl ether compounds thereto, as much as 75 per cent of the original vegetable extract content can be dispensed with, with no decrease in percentage knockdown and with a substantial increase in the kill shown by the composition. If desired, as high as from 15 to 25 per cent of the ether product may be utilized, although from about 1 to about 10 per cent, depending upon the particular compounds employed, is generally sufficient to accomplish a satisfactory control of common insect pests.

The hydroxy-alkyl ethers of phenols may be prepared by reacting a phenol or phenol compound containing a free hydroxyl group with an halo-hydrin, e. g. ethylene bromo-hydrin, propylene chloro-hydrin, or any mono-halo-aliphatic alcohol in the presence of a suitable alkali, e. g. NaOH, KOH, etc. Our co-pending applications Serial Numbers 127,176, filed February 23, 1937; 127,177, filed February 23, 1937; 127,808, filed February 20, 1937; 126,809, filed February 20, 1937; and 126,810, filed February 20, 1937, of which the present application is a continuation in part, and the application of Clarence C. Vernon, Serial Number 126,807, filed February 20, 1937, disclose in detail the preparation and properties of a large number of these hydroxy-alkyl ether compounds.

The nature of the distillate employed as a carrier for the toxic principles in the above-described compositions varies with the manner in which they are to be used. For example, if an indoor spray is desired, a readily volatile distillate is most suitable. For out-of-doors work such as, for example, in the spraying of cattle, where it is desirable that the oily spray residue be retained for a considerable period of time, a heavier and less volatile oil is employed. In certain instances where the hydroxy-alkyl ether has a limited solubility in petroleum distillate fractions, a mixture of solvents such as kerosene, methyl-ethyl ketone, or carbon tetrachloride may be employed to accomplish solution of the required percentage of toxic compounds. Other non-corrosive organic solvents, such as benzene, ethylene dichloride, hydrogenated naphthalene, butyl alcohol, etc., may be substituted for the petroleum distillates provided only that such solvent be inert with respect to the toxicants employed, non-injurious to humans, and capable of dissolving the insecticidal plant products and/or hydroxy-alkyl ethers of phenols in the required amounts.

The degree of insect pest control obtainable with petroleum distillate solutions of insecticidal plant products fortified with hydroxy-alkyl ethers of phenols is generally at least additive except where the combined toxicities of such materials is in excess of 95–100 per cent control. In many instances a synergistic effect is shown by compositions containing lower concentrations of the two classes of toxicants. That is to say, the degree of control shown by the composition comprising both plant extract and synthetic ether compound is more than additive and in excess of the sum of the percentage controls obtainable with the individual toxic products.

The hydroxy-alkyl ethers of phenols have been found to be substantially odorless and colorless, and comparatively innocuous as regards their effect upon human beings and warm blooded animals. Particularly advantageous is the fact that they do not cause irritation and dermatitis upon contact with living tissue and skin.

The method employed in determining the insecticidal toxicities of the hydroxy-alkyl ethers of phenols and combinations thereof with compounds such as the pyrethrins, rotenone, etc., consisted in a modification of the well-known Peet-Grady method. The tests were conducted in an air-tight chamber of 25 cubic feet capacity equipped with an electric vent fan for removal of spray materials after each exposure period, an aspirator attached to an electric vacuum pump being used to collect "down" flies. The test solutions were sprayed into this chamber with a De Vilbiss atomizer No. 14. All tests were carried out at a temperature of 30° C. against 3-day old flies.

In each determination a group of 100 flies was released inside the chamber, and 1.4 milliliters of the insecticidal solution under test sprayed thereinto at a pressure of 12.5 pounds. An exposure period of 10 minutes was then allowed, after which the chamber was freed of toxic vapors by means of the ventilating fan, the "down" flies collected and transferred to a rearing cage, and supplied with food. At the end of a suitable length of time, the number of dead and living flies was determined and the percentage control calculated therefrom. "Knockdown" and "mean mortality" figures as shown in the subsequent examples, represent averages of results obtained in series of runs, usually from 5 to 10, for the particular compositions concerned.

In each instance, the number of flies on the floor of the chamber was considered the "knockdown", while the kill or mortality was calculated from the number of insects failing to revive in the incubation period following removal from the spraying chamber.

The following examples are illustrative of certain particular modes in which the invention may be applied, but are not to be construed as limiting the same.

*Example 1*

A standard pyrethrin extract containing the toxic ingredients from 1 pound of pyrethrum flowers per gallon of petroleum distillate, i. e. an equivalent of 0.9 per cent by weight concentration of pyrethrins, was obtained from the National Association of Insecticide and Disinfectant Manufacturers, Inc. The petroleum distillate employed as a solvent in this standard insecticidal solution was a light mineral oil having a boiling range of 345°–508° F. and a flash point of 137° F. (T. C. C.). This standard solution will hereinafter be termed "Official Control Insecticide". Various hydroxy-alkyl ethers of phenols were incorporated into this standard solution in amounts ranging between 1 and 5 per cent thereof and tested as above described against 3-day old house flies. To provide further basis for comparison, a portion of the official control insecticide was diluted with sufficient of the above-described petroleum distillate to give a composition containing pyrethrins in amount equivalent to the toxic principle of ½ pound of pyrethrum flowers per gallon, and this solution also tested both alone and in combination with the hydroxy-alkyl ether products. The various runs from which the following "mean" results were computed were made on successive days, at least one control run being made on each such test day with the official control insecticide or diluted sample thereof employed as solvent for the hydroxy-alkyl ether compound under test.

| Material and concentration | Average percentage knockdown in 10 minutes | Mean mortality in 48 hours |
|---|---|---|
| | Percent | Percent |
| Official control insecticide | 99 | 42.4 |
| 50% official control insecticide | 98 | 27.2 |
| Official control insecticide+1% of beta-hydroxy-ethyl ether of 4-tertiary-butyl-phenol (B. P. 126.5°-127.5° C. at 4 mm. pressure) | 99 | 64.6 |
| Official control insecticide+2% of beta-hydroxy-ethyl ether of 4-tertiary-butyl-phenol | 99 | 78.6 |
| Official control insecticide+3% of beta-hydroxy-ethyl ether of 4-tertiary-butyl-phenol | 99 | 87.1 |
| 50% official control insecticide+1% of beta-hydroxy-ethyl ether of 4-tertiary-butyl-phenol | 98 | 44.8 |
| 50% official control insecticide+2% of beta-hydroxy-ethyl ether of 4-tertiary-butyl-phenol | 99 | 58.4 |
| 50% official control insecticide+3% of beta-hydroxy-ethyl ether of 4-tertiary-butyl-phenol | 100 | 81.2 |
| Official control insecticide+1% of beta-hydroxy-ethyl ether of 2-cyclohexyl-phenol (B. P. 161°-163° C. at 4 mm. pressure) | 100 | 55.4 |
| Official control insecticide+2% of beta-hydroxy-ethyl ether of 2-cyclohexyl-phenol | 99 | 71.4 |
| Official control insecticide+3% of beta-hydroxy-ethyl ether of 2-cyclohexyl-phenol | 100 | 82.2 |
| 50% official control insecticide+1% of beta-hydroxy-ethyl ether of 2-cyclohexyl-phenol | 99 | 43 |
| 50% official control insecticide+2% of beta-hydroxy-ethyl ether of 2-cyclohexyl-phenol | 99 | 64 |
| 50% official control insecticide+3% of beta-hydroxy-ethyl ether of 2-cyclohexyl-phenol | 99 | 81.1 |

Petroleum distillate solutions of the beta-hydroxy-ethyl ethers of 4-tertiary-butyl-phenol and 2-cyclohexyl-phenol alone were also tested as fly spray materials with the following results.

| Material and concentration | Average percentage knockdown in 10 minutes | Mean mortality in 48 hours |
|---|---|---|
| | Percent | Percent |
| 1% beta-hydroxy-ethyl ether of 4-tertiary-butyl-phenol | 65 | 11.5 |
| 2% beta-hydroxy-ethyl ether of 4-tertiary-butyl-phenol | 83 | 17.4 |
| 3% beta-hydroxy-ethyl ether of 4-tertiary-butyl-phenol | 92 | 47 |
| 1% beta-hydroxy-ethyl ether of 2-cyclo-hexyl-phenol | 75 | 14 |
| 2% beta-hydroxy-ethyl ether of 2-cyclo-hexyl-phenol | 77 | 21 |
| 3% beta-hydroxy-ethyl ether of 2-cyclo-hexyl-phenol | 84 | 28.5 |

Example 2

A solution of 0.1% of rotenone (melting point 163° C.) was prepared by dissolving 0.1 gram of rotenone in 12.5 grams of carbon tetrachloride and diluting to 100 milliliters with the usual petroleum distillate. The carbon tetrachloride was employed to serve as a mutual solvent, whereby in spite of its relative insolubility, the rotenone was obtained and maintained in solution in the hydrocarbon oil. This preparation of 0.1 per cent rotenone solution was employed as a base solution to prepare test compositions containing 0.075, 0.05, 0.025, and 0.01 per cent rotenone. Further test solutions were prepared in which the hydroxy-alkyl ethers of phenols were employed as a mutual solvent for both rotenone and petroleum distillate, in which composition such hydroxy-alkyl ethers were found to serve both as toxicants and as solubilizing agents. Such solutions were prepared by first dissolving the desired amount of rotenone in the hydroxy-alkyl ether product and thereafter adding the petroleum distillate thereto. As the mortality of flies sprayed with rotenone solutions did not reach a constant value for a period of approximately 72 hours following the spraying operation, all flies sprayed in this series of experiments were examined at 24, 48, and 72 hour periods to determine the mortality resulting from such treatment. The following results are representative of those obtained with compositions containing between 0.01 and 0.075 per cent of rotenone and from 1 to 3 per cent of various hydroxy-alkyl ether compounds.

| Material and concentration | Average percentage knockdown in 10 minutes | Mean mortality in— | | |
|---|---|---|---|---|
| | | 24 hours | 48 hours | 72 hours |
| | Percent | Percent | Percent | Percent |
| 0.01% of rotenone | 75 | 7 | 18 | 25 |
| 0.025% of rotenone | 76 | 8.6 | 25.2 | 37.5 |
| 0.05% of rotenone | 88 | 11 | 42.3 | 59.4 |
| 0.075% of rotenone | 89 | | 41 | 73.2 |
| 0.025% of rotenone+3% of beta-hydroxy-ethyl ether of 4-tertiary-butyl-phenol | 93 | 25 | 72 | 79.2 |
| 0.05% of rotenone+3% of beta-hydroxy-ethyl ether of 4-tertiary-butyl-phenol | 97 | 28 | 74 | 88.2 |
| 0.075% of rotenone+3% of beta-hydroxy-ethyl ether of 4-tertiary-butyl-phenol | 99 | 34 | 72.6 | 92.2 |
| 0.01% of rotenone+3% of beta-hydroxy-ethyl ether of 2-cyclohexyl-phenol | 81 | 31.3 | 52 | 56.6 |
| 0.025% of rotenone+3% of beta-hydroxy-ethyl ether of 2-cyclohexyl-phenol | 88 | | 61 | 71.8 |
| 0.05% of rotenone+3% of beta-hydroxy-ethyl ether of 2-cyclohexyl-phenol | 95 | | 84.2 | 91.2 |

Simultaneous runs with 3% solutions of the beta-hydroxy-ethyl ethers of 4-tertiary-butyl-phenol and 2-cyclo-hexyl-phenol gave the following results.

| Material and concentration | Average percentage knockdown in 10 minutes | Mean mortality in— | | |
|---|---|---|---|---|
| | | 24 hours | 48 hours | 72 hours |
| | Percent | Percent | Percent | Percent |
| 3% beta-hydroxy-ethyl ether of 4-tertiary-butyl-phenol | 94 | 34 | 52 | 54 |
| 3% beta-hydroxy-ethyl ether of 2-cyclohexyl-phenol | 81.7 | 24 | 28 | 31.1 |

Example 3

A series of tests were made to determine the comparative "speeds of knockdown" for pyrethrin solutions, rotenone solutions, and combinations of these with the hydroxy-alkyl ethers of phenols. These tests were carried out in the usual manner, except that the interior of the spray chamber was in each instance observed throughout the period of the test, and a determination made of the time required by each insecticidal composition to knock down 50 of the 100 flies used in the test. As before, a number of runs were made in each instance, and a mean value obtained by averaging the results from the several experiments.

This series of tests showed conclusively that the addition of the hydroxy-alkyl ethers to petroleum distillate solutions of pyrethrin and rotenone appreciably increased their "knockdown" rate. That is to say, the combination of materials accomplished a more speedy control of flies sprayed therewith. The results obtained with certain representative compounds are given in the following table.

| Material and concentration | Time required to knock down 50 out of 100 flies | |
|---|---|---|
| | Minutes | Seconds |
| Official control insecticide | 2 | 15 |
| 3% of beta-hydroxy-ethyl ether of 4-tertiary-butyl-phenol | 3 | 55 |
| Official control insecticide+1% of beta-hydroxy-ethyl ether of 4-tertiary-butyl-phenol | 1 | 45 |
| Official control insecticide+2% of beta-hydroxyl-ethyl ether of 4-tertiary-butyl-phenol | 1 | 51 |
| Official control insecticide+3% of beta-hydroxy-ethyl ether of 4-tertiary-butyl-phenol | 1 | 38 |
| 3% hydroxy-ethyl ether of 2-cyclohexyl-phenol | 5 | 18 |
| Official control insecticide+1% of hydroxy-ethyl ether of 2-cyclohexyl-phenol | 1 | 42 |
| Official control insecticide+2% of hydroxy-ethyl ether of 2-cyclohexyl-phenol | 1 | 36 |
| Official control insecticide+3% of hydroxy-ethyl ether of 2-cyclohexyl-phenol | 1 | 30 |

Similar results were obtained with combinations of rotenone and the hydroxy-alkyl ether compounds, in each instance the combination of materials resulting in an appreciable decrease in the time required to control 50% of the test insects.

*Example 4*

A series of investigations was made to determine the stabilizing effect exerted by hydroxy-alkyl ethers of phenols upon solutions containing such light-sensitive products as the pyrethrins, rotenone, etc. In making these tests, spray solutions which had been exposed to sunlight for a period of approximately 12 days were compared as regards toxicity with similar solutions prepared at the same time but stored away from the light. The following data is illustrative of the results obtained.

| Material and concentration | Average percentage knockdown in 10 minutes | Mean mortality in— | | |
|---|---|---|---|---|
| | | 24 hours | 48 hours | 72 hours |
| | Percent | Percent | Percent | Percent |
| Official control insecticide | 100 | 49.7 | 51 | 51.6 |
| Official control insecticide after exposure to sunlight for 12 days | 93 | 21 | 23.6 | 26.3 |
| 3% beta-hydroxy-ethyl ether of 4-tertiary-butyl-phenol | 88 | 33.3 | 39 | 39.7 |
| 3% beta-hydroxy-ethyl ether of 4-tertiary-butyl-phenol after exposure to sunlight for 12 days | 84 | 33.6 | 36 | 36.6 |
| Official control insecticide+ 3% beta-hydroxy-ethyl ether of 4-tertiary-butyl-phenol | 99 | 77.7 | 89.6 | 92 |
| Official control insecticide+ 3% beta-hydroxy-ethyl ether of 4-tertiary-butyl-phenol after exposure to sunlight for 12 days | 95.6 | 68 | 81 | 82 |
| 0.1% rotenone | 92 | 15.6 | 48.3 | 75.6 |
| 0.1% rotenone after exposure to sunlight for 12 days | 42 | 6 | 8 | 11.3 |
| 0.1% rotenone+3% beta-hydroxy-ethyl ether of 4-tertiary-butyl-phenol | 98 | 35.3 | 93 | 99.3 |
| 0.1% rotenone+3% beta-hydroxy-ethyl ether of 4-tertiary-butyl-phenol after exposure to sunlight for 12 days | 95 | 38.3 | 84.3 | 93 |

Of the above, the uncombined rotenone and pyrethrum solutions became colorless upon exposure to light, and each developed a substantial amount of precipitate. The combination of rotenone or pyrethrin with the beta-hydroxy-ethyl ether of 4-tertiary-butyl-phenol gives solutions which, upon exposure to sunlight, suffered some loss in color but were substantially free from precipitate. The toxicity of combinations of the insecticidal plant materials and hydroxy-alkyl ether compounds did not appear to be materially affected by exposure to sunlight.

*Example 5*

Similarly, other hydroxy-alkyl ethers of phenols have been tested as insecticides, and particularly as fly spray materials. The following table sets forth the per cent knockdown and mortality obtained with petroleum distillate solutions of certain representative compounds.

| Compound | Per cent tested | Average percentage knockdown in 10 minutes | Mean mortality in— | |
|---|---|---|---|---|
| | | | 24 hours | 48 hours |
| | Per cent | Per cent | Per cent | Per cent |
| Beta-hydroxy-ethyl ether of 2-methyl-phenol | 10 | 86 | 25 | -------- |
| Beta-hydroxy-ethyl ether of 4-tertiary-amyl-phenol (B. P. 145°–148° C. at 4 mm. pressure) | 3 | 81 | 40 | 45 |
| Beta-hydroxy-ethyl ether of 2-methyl-4-tertiary-butyl-phenol (M. P. 36° C.) | 3 | 88 | 36 | 42 |
| Beta-hydroxy-ethyl ether of 2-chloro-4-tertiary-butyl-phenol (B. P. 130°–132° C. at 2 mm. pressure) | 5 | 89 | 38 | 45 |
| Beta-hydroxy-ethyl ether of 4-(1-methyl-cyclohexyl)-phenol (B. P. 175°–176° C. at 4 mm. pressure) | 3 | 78 | 36 | 39 |
| Beta-hydroxy-ethyl ether of 2-cyclohexyl-4-chloro phenol (B. P. 166°–168° C. at 4 mm. pressure) | 3 | 82 | 37 | 46 |
| Beta-hydroxy-ethyl ether of 4-isopropyl-6-phenyl-phenol (M. P. 57° C.) | 5 | 38 | 20 | -------- |
| Beta-hydroxy-ethyl ether of 2,4-dichloro-6-phenyl-phenol (B. P. 181°–183° C. at 4–5 mm. pressure) | 5 | 69 | 46 | -------- |
| Hydroxy-propyl ether of 3-phenylphenol (B. P. 168°–169° C. at 4 mm. pressure) | 5 | 41 | 32 | -------- |
| Hydroxy-propyl ether of 4-isopropyl-6-phenylphenol (B. P. 166°–168° C. at 4 mm. pressure) | 5 | 44 | 25 | -------- |
| Hydroxy-propyl ether of 2,4-dichloro-6-phenylphenol (B. P. 173°–176° C. at 4 mm. pressure) | 5 | 57 | 27 | -------- |
| Hydroxy-propyl ether of 2-cyclohexyl-phenol (B. P. 147°–149° C. at 3 mm. pressure) | 3 | 86 | 28 | -------- |
| Hydroxy-propyl ether of 4-tertiary-butyl-phenol (M. P. 45° C.) | 3 | 86 | 21 | 28.5 |

Among other hydroxy-alkyl ethers of phenols which have been found suitable for use as fly spray toxics are the following: beta-hydroxy-ethyl ether of phenol, beta-hydroxy-ethyl ether of 4-isopropyl-phenol, beta-hydroxy-ethyl ether of 2-tertiary-butyl-phenol, beta-hydroxy-ethyl ether of 2,4-di-tertiary-butyl-phenol, beta-hydroxy-ethyl ether of 2,4-dichloro-phenol, beta-hydroxy-ethyl ether of 4-cyclohexyl-phenol, beta-hydroxy-ethyl ether of 2-phenyl-phenol, beta-hydroxy-ethyl ether of 4-phenyl-phenol, beta-hydroxy-ethyl ether of 2-phenyl-4-tertiary-butyl-phenol, beta-hydroxy-ethyl ether of 2,4-di-tertiary-butyl-6-phenyl-phenol, beta-hydroxy-ethyl ether of 2-phenyl-4-chloro-phenol, beta-hydroxy-ethyl ether of 2-bromo-4-phenyl-phenol, beta-hydroxy-ethyl ether of beta-naphthol, betahydroxy-ethyl ether of 4-hydroxy-aceto-phenone, beta-hydroxy-ethyl ether of 4-hydroxy-propio-phenone, beta-hydroxy-ethyl ether of 4-hydroxy-benzophenone, beta-hydroxy-ethyl ether of 2-chloro-phenol, beta-hydroxy-ethyl ether of 4-chloro-phenol, beta-hydroxy-ethyl ether of 2,4-dichloro-phenol, beta-hydroxy-ethyl ether of 2-methoxy-phenol, beta-hydroxy-ethyl ether of 3-phenyl-phenol, beta-hydroxy-ethyl ether of 2-chloro-6-phenyl-phenol, beta-hydroxy-ethyl ether of 4-tertiary-octyl-phenol, hydroxy-propyl ether of 2-phenyl-phenol, hydroxy-propyl ether of 2-bromo-4-phenyl-phenol, hydroxy-propyl ether of 4-cyclohexyl-phenol, hydroxy-isobutyl ether of 2-cyclohexyl-phenol, beta-hydroxy-ethyl ether of 3-methyl-phenol, beta-hydroxy-ethyl ether of 4-methyl-phenol, beta-hydroxy-ethyl ether of 2-methyl-4,6-di-tertiary-butyl-phenol, beta-hydroxy-ethyl ether of 2-chloro-4,6-di-tertiary-butyl-phenol, beta-hydroxy-ethyl ether of 4-phenyl-azo-phenol, di-(beta-hydroxy-ethyl)-ether of 2,2-di-(4-hydroxy-phenyl)-propane.

Similarly, other hydroxy-alkyl ethers of phenols may be used as fly toxics, e. g. beta-hydroxy-ethyl ether of 2-n-propyl-phenol, beta-hydroxy-ethyl ether of 3-n-propyl-phenol, beta-hydroxy-ethyl ether of 4-n-propyl-phenol, beta-hydroxy-ethyl ether of 2-methyl-4-n-propyl-phenol, beta-hydroxy-ethyl ether of 2-chloro-4-n-propyl-phenol, beta-hydroxy-ethyl ether of 2-n-butyl-phenol, beta-hydroxy-ethyl ether of 3-n-butyl-phenol, beta-hydroxy-ethyl ether of 4-n-butyl-phenol, beta-hydroxy-ethyl ether of 2-chloro-4-n-butyl-phenol, beta-hydroxy-ethyl ether of 2-bromo-4-n-butyl-phenol, beta-hydroxy-ethyl ether of 2,4-di-n-propyl-phenol, beta-hydroxy-ethyl ether of 2,4-di-n-butyl-phenol, beta-hydroxy-ethyl ether of 4-n-amyl-phenol, beta-hydroxy-ethyl ether of 2-n-amyl-phenol, beta-hydroxy-ethyl ether of 2-methyl-4-n-amyl-phenol, beta-hydroxy-ethyl ether of 2-chloro-4-n-amyl-phenol, beta-hydroxy-ethyl ether of 2-isopropyl-phenol, beta-hydroxy-ethyl ether of 4-propenyl-phenol, beta-hydroxy-ethyl ether of 2-methyl-4-isopropyl-phenol, beta-hydroxy-ethyl ether of 2-chloro-4-isopropyl-phenol, beta-hydroxy-ethyl ether of 2,4-di-isopropyl-phenol, beta-hydroxy-ethyl ether of 3-cyclohexyl-phenol, beta-hydroxy-ethyl ether of 2-methyl-4-cyclohexyl-phenol, beta-hydroxy-ethyl ether of 4-methyl-6-cyclohexyl-phenol, beta-hydroxy-ethyl ether of 2-chloro-4-cyclohexyl-phenol, beta-hydroxy-ethyl ether of 2,4-dichloro-6-cyclohexyl-phenol, beta-hydroxy-ethyl ether of 2-methyl-4-phenyl-phenol, beta-hydroxy-ethyl ether of 2-chloro-5-phenyl-phenol, beta-hydroxy-ethyl ether of 2-benzyl-phenol, beta-hydroxy-ethyl ether of 2-benzyl-4-chloro-phenol, beta-hydroxy-ethyl ether of 2-chloro-4-benzyl-phenol, beta-hydroxy-ethyl ether of 2,4-dichloro-6-benzyl-phenol, beta-hydroxy-ethyl ether of 2-methyl-4-benzyl-phenol, beta-hydroxy-ethyl ether of 4-stearyl-phenol, beta-hydroxy-ethyl ether of 2-chloro-4-stearyl-phenol, beta-hydroxy-ethyl ether of 2-stearyl-phenol, beta-hydroxy-ethyl ether of 4-nitro-phenol, beta-hydroxy-ethyl ether of 4-hydroxy-methyl-benzoate, beta-hydroxy-ethyl ether of 2-hydroxy-isopropyl-benzoate, beta-hydroxy-ethyl ether of 4-methoxy-phenol, beta-hydroxy-ethyl ether of tertiary-butyl-naphthol, beta-hydroxy-ethyl ether of 4-chloro-alpha-naphthol, beta-hydroxy-ethyl ether of 2,4-dichloro-alpha-naphthol, mono-(beta-hydroxy-ethyl)-ether of hydroquinone, mono-(beta-hydroxy-ethyl)-ether of catechol, mono-(beta-hydroxy-ethyl)-ether of resorcinol, di-(beta-hydroxy-ethyl)-ether of resorcinol, hydroxy-propyl ether of 4-isohexyl-phenol, hydroxy-propyl ether of 2-cyclohexyl-4-chloro-phenol, hydroxy-propyl ether of naphthol, hydroxy-propyl ether of 4-tertiary-amyl-phenol, hydroxy-butyl ether of 4-tertiary-butyl-phenol, hydroxy-butyl ether of phenol, hydroxy-butyl ether of 2-chloro-4-tertiary-butyl-phenol, etc.

Mixtures of the above compounds may be dissolved in suitable solvents to obtain liquid spray products having desirable characteristics as regards insecticidal toxicity, speed and percentage of knockdown and kill, and stability to light and heat. Likewise, the hydroxy-alkyl ether products may be employed with extracts of derris, cube, barbasco, and other insecticidal plant products. The petroleum distillates employed may vary from light kerosene fractions to highly refined white oils, the sulphonation values thereof varying over a wide range.

The phrase "non-corrosive organic solvent" as employed in the following claims refers to any organic solvent material unreactive with and capable of dissolving the toxicants hereinbefore described, and non-injurious to the skin and general health of humans.

Other modes of applying the principle of our invention may be employed instead of those explained, change being made as regards the materials or the amounts thereof employed, providing the compositions defined by any of the following claims or their equivalent be employed.

We therefore particularly point out and distinctly claim as our invention:

1. A substantially water-free insecticidal spray comprising as its principal toxic ingredient a hydroxyl-alkyl ether of a phenol dissolved in a non-corrosive organic solvent.

2. A substantially water-free insecticidal spray comprising as a toxicant a hydroxy-alkyl ether of an alkyl phenol dissolved in a non-corrosive organic solvent.

3. A substantially water-free insecticidal spray comprising a non-corrosive organic solvent having dissolved therein as insecticidal toxicants a product selected from the class consisting of the extracts of pyrethrin- and rotenone-bearing plants, and a hydroxy-alkyl ether of a phenol.

4. A substantially water-free insecticidal spray comprising a petroleum distillate solution of an insecticidal product selected from the class consisting of the extracts of pyrethrin- and rotenone-bearing plants, and as an additional toxicant an hydroxy-alkyl ether of a phenol dissolved therein in amount ranging between 1 and 25 grams per 100 milliliters thereof.

5. A substantially water-free insecticidal spray comprising a petroleum distillate solution of an extract of a pyrethrin-bearing plant and as an additional toxicant an hydroxy-alkyl ether of a phenol.

6. A substantially water-free insecticidal spray comprising a petroleum distillate solution of an extract of a rotenone-bearing plant and as an additional toxicant an hydroxy-alkyl ether of a phenol.

7. A substantially water-free insecticidal spray comprising a petroleum distillate solution of an extract of a pyrethrin-bearing plant and as an additional toxicant an hydroxy-alkyl ether of a 4-alkyl phenol.

8. A substantially water-free insecticidal spray comprising a petroleum distillate solution of an extract of a pyrethrin-bearing plant and as an additional toxicant the beta-hydroxy-ethyl ether of 4-teritary-butyl phenol.

9. A substantially water-free insecticidal spray comprising a petroleum distillate solution of an extract of a pyrethrin-bearing plant and as an additional toxicant the beta-hydroxy-ethyl ether of 2-cyclohexyl phenol.

10. A substantially water-free insecticidal spray comprising a petroleum distillate solution of an extract of a rotenone-bearing plant and as an additional toxicant an hydroxy-alkyl ether of 4-tertiary-butyl phenol.

GERALD H. COLEMAN.
JOHN W. ZEMBA.